US007299233B2

(12) United States Patent
Ikegawa

(10) Patent No.: US 7,299,233 B2
(45) Date of Patent: Nov. 20, 2007

(54) COPYING APPARATUS, METHOD OF CONTROLLING THE SAME, AND PROGRAM FOR IMPLEMENTING THE METHOD

(75) Inventor: Yoshiharu Ikegawa, Kanagawa (JP)

(73) Assignee: Canon Kabushiki Kaisha (JP)

( * ) Notice: Subject to any disclaimer, the term of this patent is extended or adjusted under 35 U.S.C. 154(b) by 214 days.

(21) Appl. No.: 10/699,564

(22) Filed: Oct. 31, 2003

(65) Prior Publication Data

US 2004/0141761 A1 Jul. 22, 2004

(30) Foreign Application Priority Data

Oct. 31, 2002 (JP) ............................ 2002-317717

(51) Int. Cl.
*G06F 7/00* (2006.01)
*G06F 17/00* (2006.01)

(52) U.S. Cl. ........................... 707/100; 707/1; 358/1.1

(58) Field of Classification Search .................... 707/1, 707/10, 100; 715/505, 515; 358/1.1
See application file for complete search history.

(56) References Cited

U.S. PATENT DOCUMENTS

| | | | | |
|---|---|---|---|---|
| 5,606,609 | A * | 2/1997 | Houser et al. | 715/515 |
| 6,751,336 | B2 * | 6/2004 | Zhao | 382/100 |
| 2002/0082027 | A1 * | 6/2002 | Nagata | 455/456 |
| 2003/0188260 | A1 * | 10/2003 | Jensen et al. | 715/505 |

* cited by examiner

*Primary Examiner*—Sam Rimell
(74) *Attorney, Agent, or Firm*—Rossi, Kimms & McDowell LLP

(57) ABSTRACT

There is provided a copying apparatus and a method of controlling the same which are capable of performing a proper search for an original file even when the image quality of the original is heavily degraded such that the additional information cannot be read or is not correctly recognized, to thereby obtain a copy without degradation in image quality regardless of the condition of the original. Additional information is read from an image signal from an original inputted by a scanner unit. A search is carried out for an original file corresponding to the original based on the read additional information. A printer outputs a copy of the original using the original file found as a result of the search. The additional information is displayed and edited. The search is controlled using the edited additional information.

13 Claims, 18 Drawing Sheets

COPYING APPARATUS, METHOD OF CONTROLLING THE SAME, AND PROGRAM FOR IMPLEMENTING THE METHOD

BACKGROUND OF THE INVENTION

1. Field of the Invention

The present invention relates to a copying apparatus, a method of controlling the same, and a program for implementing the method, and in particular to a copying apparatus that is connected to a network or a public telephone line, and a method of controlling the same, and a program for implementing the method.

2. Description of the Related Art

A copying apparatus with a copy function that reads an original using a scanner, detects additional information that has been added to the original using a technique such as an electronic watermark or a barcode, and prints out an original file based on the additional information instead of outputting a copy of the read original has been conventionally proposed. By using such a copying apparatus, it is possible to obtain a copy output with no degradation in image quality compared to the original. Even if the original is a second or third generation copy with degraded image quality, by printing out the original file as mentioned above, it is possible to restore the image quality of the first generation original.

However, when the image quality of the original is heavily degraded, or when the original was produced by enlarged or reduced copying the first generation original, there has been the problem that the conventional copying apparatus cannot read or misrecognizes the additional information, and so cannot find the original file.

SUMMARY OF THE INVENTION

It is an object of the present invention to provide a copying apparatus and a method of controlling the same which are capable of performing a proper search for an original file even when the image quality of the original is heavily degraded such that the additional information cannot be read or is not correctly recognized, to thereby obtain a copy without degradation in image quality regardless of the condition of the original.

To attain the above object, in a first aspect of the present invention, there is provided a copying apparatus comprising an image input device that inputs an image signal read from an original, an additional information reading device that reads additional information from the inputted image signal, a search device that carries out a search for an original file corresponding to the original based on the read additional information, a copy output device that outputs a copy of the original using the original file found as a result of the search by the search device, a display device that displays the additional information, an editing device that edits the displayed additional information, and a controller that controls the search device to carry out the search for the original file using the edited additional information.

Preferably, the controller determines that editing of the additional information by the editing device is possible when the original file has not been found as a result of the search by the search device.

Preferably, the controller determines that the search for the original file by the search device is possible when editing of the additional information read from the inputted image signal is completed.

Preferably, the copying apparatus is connected to at least one information processing apparatus via a network or a communication line, and the search device searches the at least one information processing apparatus for the original file.

Preferably, the additional information comprises electronic watermark information embedded in the original.

Preferably, the additional information comprises barcode information printed on the original.

To attain the above object, in a second aspect of the present invention, there is provided a method of controlling a copying apparatus, comprising the steps of inputting an image signal read from an original, reading additional information from the inputted image signal, carrying out a search for an original file corresponding to the original based on the read additional information, outputting a copy of the original using the original file found as a result of the search in the searching step, displaying the additional information, editing the displayed additional information, and controlling the search for the original file to be carried out using the edited additional information in the searching step.

Preferably, it is determined in the controlling step that editing of the additional information in the editing step is possible when the original file has not been found as a result of the search in the searching step.

Preferably, it is determined in the controlling step that the search for the original file in the searching step is possible when editing of the additional information read from the inputted image signal is completed.

Preferably, the copying apparatus is connected at least one information processing apparatus via a network or a communication line, and in the searching step the at least one information processing apparatus is searched for the original file.

Preferably, the additional information comprises electronic watermark information embedded in the original.

Preferably, the additional information comprises barcode information printed on the original.

To attain the above object, in a third aspect of the present invention, there is provided a computer-readable program for causing a computer to execute a method of controlling a copying apparatus, comprising an image input module for inputting an image signal read from an original, an additional information reading module for reading additional information from the inputted image signal, a search module for carrying out a search for an original file corresponding to the original based on the read additional information, a copy output module for outputting a copy of the original using the original file found as a result of the search by the search module, a display module for displaying the additional information, an editing module for editing the displayed additional information, and a control module for controlling the search for the original file to be carried out using the edited additional information by the search module.

According to the first aspect of the present invention, a proper search can be carried out for an original file even when the image quality of an original is heavily degraded such that the additional information cannot be read or is not correctly recognized, so that a copy with no degradation in image quality can be obtained regardless of the condition of the original.

Further, editing of the additional information is enabled only when the search has not been able to find an original file due to the additional information being incorrect, so that the operability of the copying apparatus can be enhanced.

Further, whether or not the additional information is correct can be determined before the search for the original file is started, and the additional information can be corrected immediately when the additional information has been determined to be incorrect.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the accompanying drawings showing preferred embodiments thereof.

Figure 1:
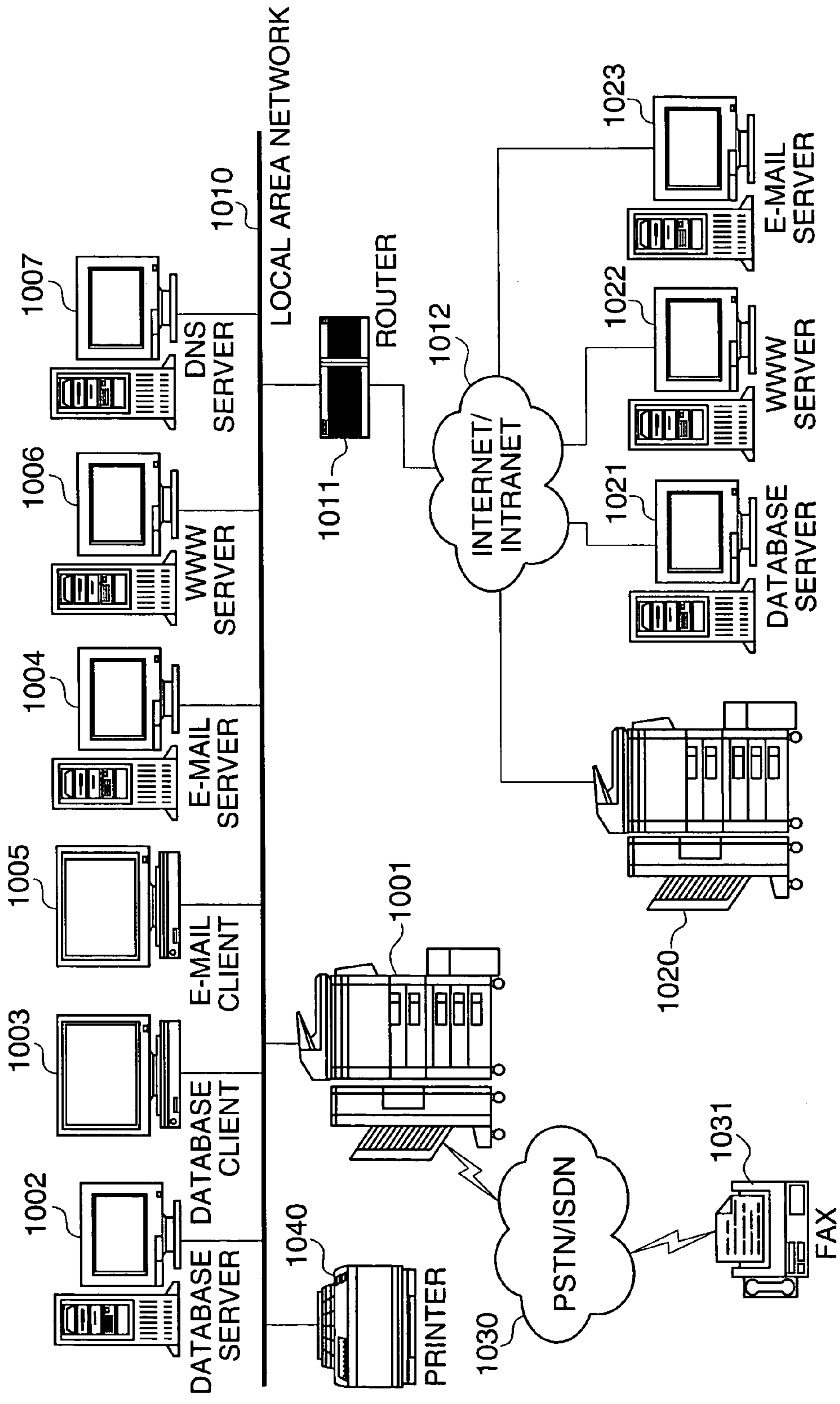
FIG. 1 is a diagram showing the overall construction of a network system including a copying apparatus according to a first embodiment of the present invention.

FIG. 1 is a diagram showing the overall construction of a network system including a copying apparatus according to a first embodiment of the present invention. In FIG. 1, reference numeral 1001 designates a multi-function apparatus as the copying apparatus according to the present embodiment. The multi-function apparatus 1001 is comprised of a scanner and a printer, described later. Images read by the scanner are outputted to a local area network (hereinafter "LAN") 1010 and images received from the LAN 1010 are printed using the printer. Further, Images read by the scanner are transmitted to a PSTN or ISDN 1030 by a FAX transmission section, not shown, and images received from the PSTN or ISDN 1030 are printed by the printer.

Reference numeral 1002 designates a database server that manages binary images or multivalue images that have been read from the multi-function apparatus 1001 as a database. Reference numeral 1003 designates a database client for the database server 1002. The database client 1003 browses and searches image data stored in the database server 1002. Reference numeral 1004 designates an electronic mail server that can receive images read from the multi-function apparatus 1001 as attachment files of electronic mails.

Reference numeral 1005 designates an electronic mail client for the electronic mail server 1004. The electronic mail client 1005 receives and browses electronic mails received by the electronic mail server 1004, and transmits electronic mails. Reference numeral 1006 designates a WWW server that provides HTML documents to the LAN 1010. The multi-function apparatus 1001 can print HTML documents provided from the WWW server 1006. Reference numeral 1007 designates a DNS server.

Reference numeral 1011 designates a router that connects the LAN 1010 to the Internet or an Intranet 1012. Similar apparatuses to the database server 1002, the WWW server 1006, the electronic mail server 1004, and the multi-function apparatus 1001 mentioned above, that is, a database server 1021, a WWW server 1022, an electronic mail server 1023, and a multi-function apparatus 1020 are connected to the Internet/Intranet 1012.

The multi-function apparatus 1001 can communicate with a FAX apparatus 1031 via the PSTN or ISDN 1030. A printer 1040 is also connected to the LAN 1010 and can print images read by the multi-function apparatus 1001.

Figure 2:
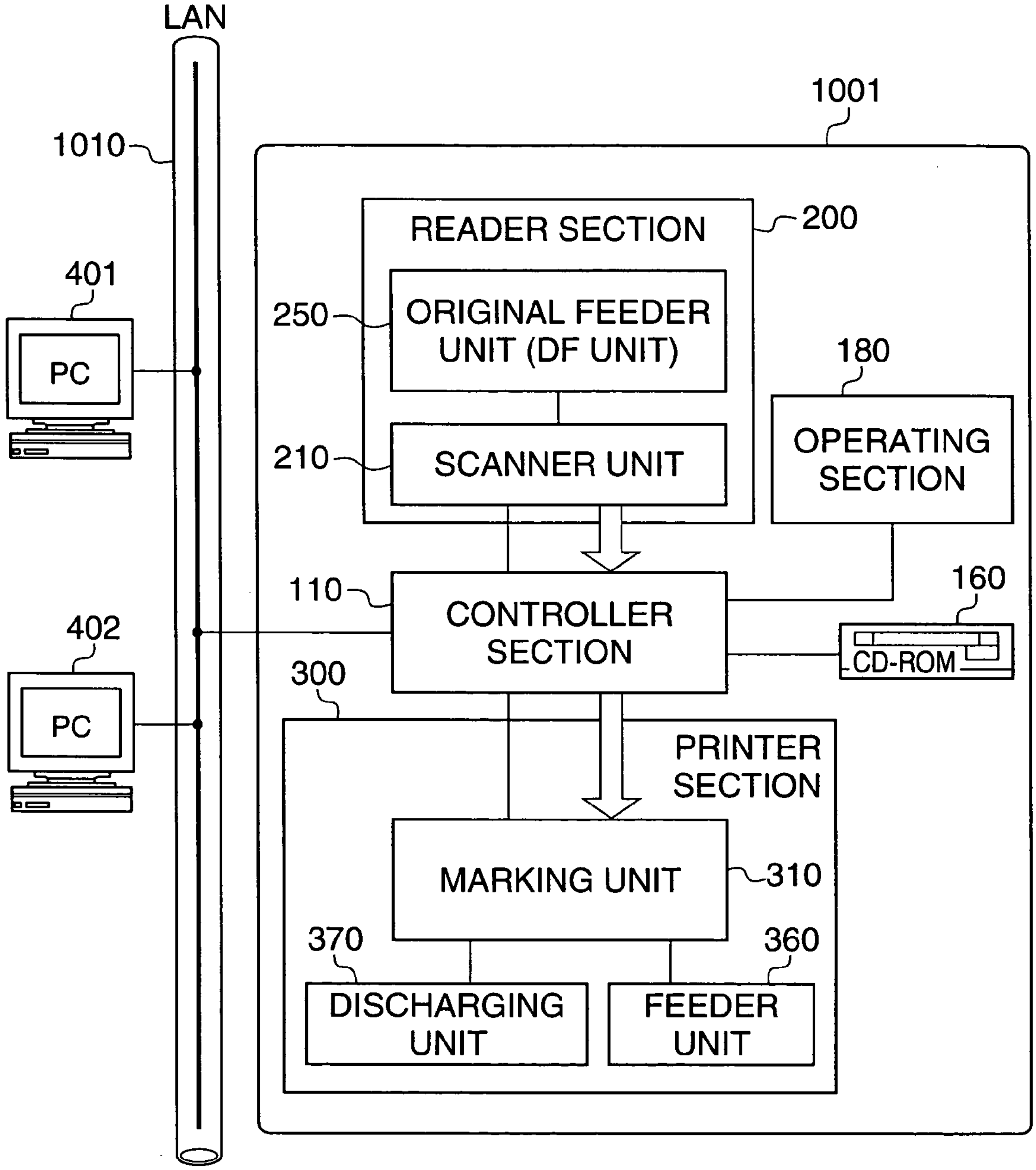
FIG. 2 is a block diagram showing the construction of a multi-function apparatus 1001 appearing in FIG. 1.

FIG. 2 is a block diagram showing the construction of the multi-function apparatus 1001. In FIG. 2, the multi-function apparatus 1001 is mainly comprised of a reader section 200, a printer section 300, a controller section 110, and an operating section 180.

The reader section 200 optically reads an image of an original and converts the image into image data, and is comprised of a scanner unit 210 that reads the original, and an original feeder unit (DF unit) 250 that conveys the original. The printer section 300 conveys a recording sheet, and after printing image data on the recording sheet as a visible image, discharges the recording sheet to outside the multi-function apparatus 1001. The printer section 300 is comprised of a feeder unit 360 that includes a plurality of types of recording sheet cassette, a marking unit 310 that transfers and fixes image data onto a recording sheet, and a discharging unit 370 that sorts and staples printed recording sheets and outputs the printed recording sheets to outside the multi-function apparatus 1001.

The controller section 110 is electrically connected to the reader section 200 and the printer section 300 and is also connected to host computers 401 and 402 via the LAN 1010. It should be noted that the host computers 401, 402 represent the various apparatuses connected to the LAN 1010 in FIG. 1. The controller section 110 also provides a copy function that controls the reader section 200 to read image data of an original and controls the printer section 300 to output the image data onto a recording sheet. The controller section 110 also provides a scanner (OCR) function that converts image data read by the reader section 200 into code data that is transmitted via the LAN 1010 to the host computers 401 and 402, and a printer function that converts code data received from the host computers 401 and 402 via the LAN 1010 into image data that is outputted to the printer section 300.

The operating section 180 is connected to the controller section 110, is composed of a liquid crystal touch panel, and provides a user interface for operating the multi-function apparatus 1001.

Figure 3:
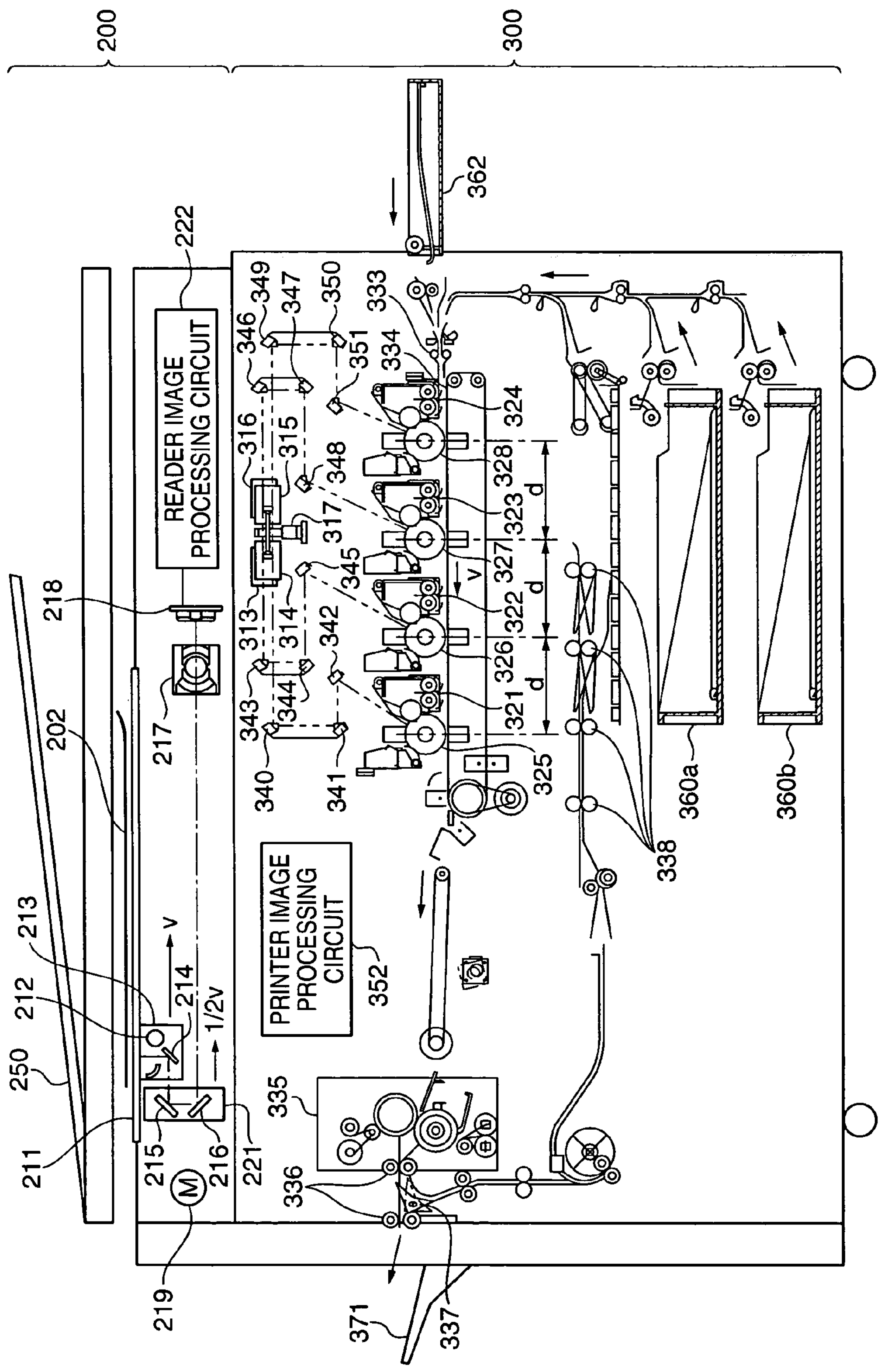
FIG. 3 is a schematic cross-sectional view showing the construction of a reader section 200 and a printer section 300.

FIG. 3 is a schematic cross-sectional view showing the construction of the reader section 200 and the printer section 300. The original feeder unit 250 inside the reader section 200 feeds originals one sheet at a time from the top of a stack thereof to a platen glass 211, and after the reading operation is completed for a fed original on the platen glass 211, discharges the original.

When an original has been conveyed onto the platen glass 211, the reader section 200 turns on a lamp 212 and causes an optical unit 213 start to move to scan and expose to light the original. The light reflected from the original is guided by mirrors 214, 215, and 216 and a lens 217 to a CCD image sensor (hereinafter referred to simply as "CCD") 218. In this way, the image of the scanned original is read by the CCD 218.

Reference numeral 222 designates a reader image processing circuit (section) that carries out predetermined processing on image data outputted from the CCD 218 and outputs the image data via a scanner interface, not shown, to the controller section 110. Reference numeral 352 designates a printer image processing circuit (section) that outputs image signals sent from the controller section 110 via a printer interface, not shown, to a laser driver 317 of the printer section 300.

The laser driver 317 of the printer section 300 drives laser emitters 313, 314, 315, and 316 to cause the laser emitters 313, 314, 315, and 316 to emit laser light in accordance with the image signals outputted from the printer image processing circuit 352. The laser light is incident on photosensitive drums 325, 326, 327, and 328 via mirrors 340, 341, 342, 343, 344, 345, 346, 347, 348, 349, 350, and 351, so that latent images are formed on the photosensitive drums 325, 326, 327, and 328 in accordance with the laser light.

Reference numerals 321, 322, 323, and 324 designate developing units that develop the latent images using black (Bk), yellow (Y), cyan (C), and magenta (M) toner, respectively. The developed toner images in respective colors are transferred onto a recording sheet to produce a full-color printout.

A recording sheet that has been fed from one of recording sheet cassettes 360*a* and 360*b* and a manual feed tray 362 in timing synchronized with the start of emission of the laser light is conveyed via a registration roller 333 and is attached to a transfer belt 334 to be further conveyed. Toner images that have been attached to the photosensitive drums 325, 326, 327, and 328 are then transferred onto the recording sheet. The recording sheet onto which the toner images have been transferred is conveyed to a fixing section 335 that fixes the toner images onto the recording sheet using heat and pressure. The recording sheet that has passed the fixing section 335 is discharged by discharge rollers 336, and then the discharging unit 370 bundles and sorts discharged recording sheets, and staples sorted recording sheets as required.

On the other hand, when a double-sided recording mode is set, after the recording sheet has been conveyed to the discharge rollers 336, the direction of rotation of the discharge rollers 336 is reversed, and the recording sheet is guided to a refeeding conveying path 338 by a flapper 337. The recording sheet guided to the refeeding conveying path 338 is fed to the transfer belt 334 in the timing mentioned above.

Figure 4:
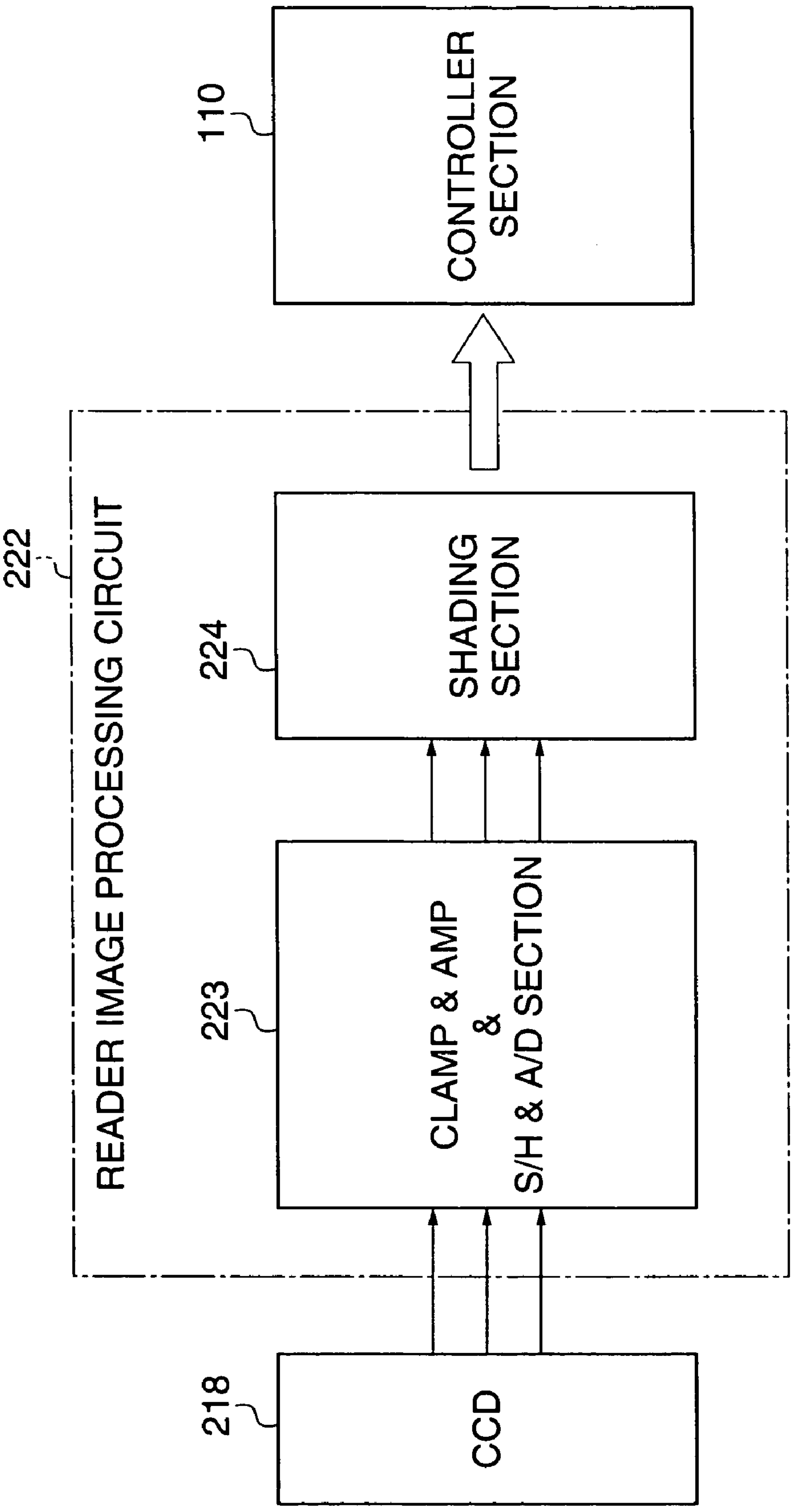
FIG. 4 is a block diagram showing the construction of a reader image processing section 222.

FIG. 4 is a block diagram showing the construction of the reader image processing section 222. The reader image processing section 222 is supplied with electric signals outputted from the CCD 218 that reads an original on the platen glass 211.

In the case where the CCD 218 is a color sensor, the CCD 218 may be implemented by a single-line CCD where red (R), green (G) and blue (B) color filters are provided in a line in the order of red (R), green (G) and blue (B) or by a three-line CCD where a red (R) filter, a green (G) filter, and a blue (B) filter are arranged on separate CCDs. The filters may be provided on a chip, or may be constructed separately to the CCD 218.

Electric signals (analog image signals)from the CCD 218 are inputted to the reader image processing section 222 and are sampled and held (S/H) by a clamp & amp & S/H & A/D section 223. The clamp & amp & S/H & A/D section 223 clamps a dark level of the analog image signals at a reference potential, amplifies the analog image signals by a predetermined amount, and then carries out an A/D conversion, to convert the analog image signals into 8-bit digital signals for R, G, and B, respectively, for example. The RGB signals are subjected to a shading correction and a black correction by a shading section 224 at the next stage, and are then outputted to the controller section 110.

Figure 5:
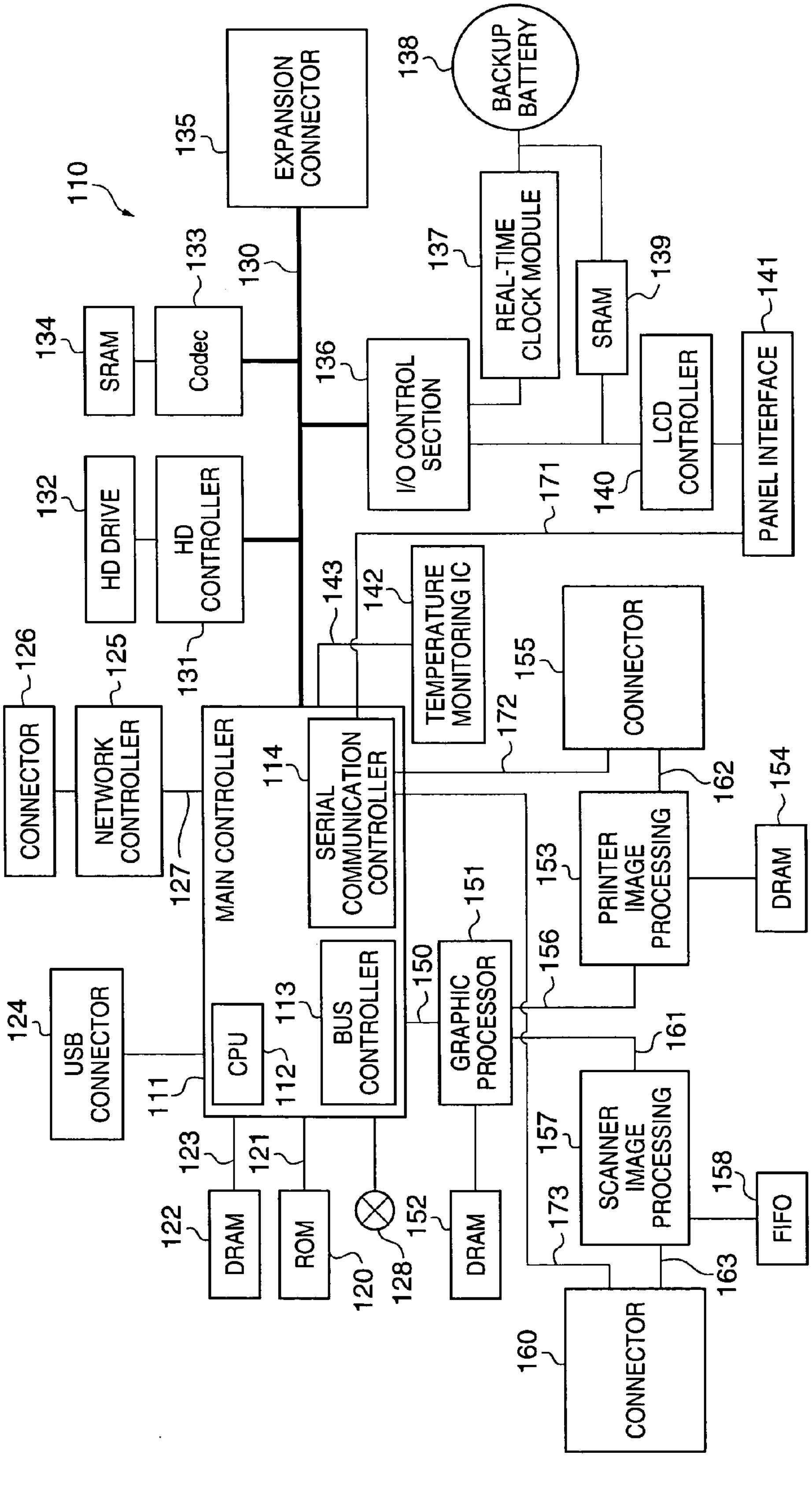
FIG. 5 is a block diagram showing the construction of a controller section 110.

FIG. 5 is a block diagram showing the construction of the controller section 110. A main controller 111 mainly is comprised of a CPU 112, a bus controller 113, and various interface controllers including an asynchronous serial communication controller 114. The CPU 112 and the bus controller 113 control the overall operation of the controller section 110. The CPU 112 executes a program read from a ROM 120 via a ROM interface 121. A process that interprets PDL (Page Description Language) code data received from a host computer and expands the same into raster image data is also described in this program.

The bus controller 113 controls transfer of data inputted and outputted via various interfaces, and controls DMA (Direct Memory Access) data transfer as well as arbitration when there is a bus conflict. A DRAM 122 is connected to the main controller 111 via a DRAM interface 123, and is used as a work area for operations by the CPU 112 and as an area for storing image data.

The asynchronous serial communication controller 114 transmits and receives control commands to and from respective CPUs of the reader section 200 and the printer section 300 via serial buses 172, and 173 and carries out communication for a touch panel and key inputs of the operating section 180.

A network controller 125 is connected to the main controller 111 via an interface 127 and is also connected to an external network via a connector 126. For example, the external network can be typically implemented by a ETHERNET (registered trademark).

A serial connector 124 is connected to the main controller 111 and communicates with an external apparatus. For example, the serial bus can be typically implemented by a USB. A fan 128 is connected to the main controller 111 and is used to cool the controller section 110.

A temperature monitoring IC 142 is connected to the main controller 111 via a serial bus 143 and is used for control of the fan 128, temperature compensation of a real-time clock module 137, and the like.

A general-purpose high-speed bus 130 has connected thereto an expansion connector 135 for connecting an expansion board, an I/O controller 136, an HD controller 131, and a codec 133. For example, the general-purpose high-speed bus 130 can be typically implemented by a PCI (Peripheral Component Interconnect) bus.

The codec 133 compresses raster image data stored in the DRAM 122 according to a method such as MH, MR, MMR, JBIG, or JPEG, and conversely, expands compressed code data that has been stored into raster image data. An SRAM

134 is used as a temporary work area for the codec 133. Transfers of data to and from the DRAM 122 are controlled by the bus controller 113 such that the data is DMA-transferred.

The HD controller 131 is provided for connecting the controller section 110 to external storage devices. In the present embodiment, a hard disk drive 132 is connected via the HD controller 131. The hard disk drive 132 is used to store programs and image data.

The I/O controller 136 controls a data bus and also controls ports and interrupts. The panel interface 141 is connected to an LCD controller 140 and also connected to the serial communication controller 114 via a serial bus 171 and is comprised of an interface for performing display on a liquid crystal display of the operating section 180, and a key input interface for making inputs hard keys or touch panel keys.

The serial bus 171 transfers to the CPU 112 signals inputted using the touch panel attached to the liquid crystal display section or the hard keys of the operating section 180. The panel interface 141 sends image data for display on the liquid crystal display section to the operating section 180.

The real-time clock module 137 updates and stores a date and time managed in the multi-function apparatus 1001, and is backed up by a backup battery 138. The SRAM 139 is also backed up by the backup battery 138, and stores user modes, various kinds of setting information, file management information for the hard disk drive 132, and the like.

A graphic processor 151 carries out processes, such as image rotation, image magnification/reduction, color space conversion, binarization, scanner image input, and printer image output, on image data stored in the DRAM 122. A DRAM 152 is used as a temporary work area for the graphic processor 151. The graphic processor 151 is connected to the main controller 111 via an interface 150. Data transfers to and from the DRAM 122 are controlled by the bus controller 113 such that the data is DMA-transferred.

Connectors 160 and 155 are connected respectively to the reader section 200 and the printer section 300 and are provided respectively with an asynchronous serial interface (173, 172) and a video interface (163, 162).

A scanner image processing section 157 is connected to the reader section 200 via the connector 160 and is also connected to the graphic processor 151 via a scanner bus 161. The scanner image processing section 157 has a function of performing predetermined processing on an image received from the reader section 200 and also a function of outputting a control signal, which is generated based on a video control signal sent from the reader section 200, to the scanner bus 161. A FIFO 158 is connected to the scanner image processing section 157 and is used to perform a line correction on a video signal sent from the reader section 200.

A printer image processing section 153 is connected to the printer section 300 via the connector 155 and is also connected to the graphic processor 151 via a printer bus 156. The printer image processing section 153 has a function of performing predetermined processing on image data outputted from the graphic processor 151 and then outputting the image data to the printer section 300, and also a function of outputting a control signal, which is generated based on a video control signal sent from the printer section 300, to a video interface 162.

A DRAM 154 is connected to the printer image processing section 153 and is used to delay a video signal by a fixed time period. Transfer of raster image data expanded on the DRAM 154 to the printer section 300 is controlled by the bus controller 113 such that the data is DMA-transferred to the printer section 300 via the graphic processor 151, the printer image processing section 153, and the connector 155.

Figure 6:
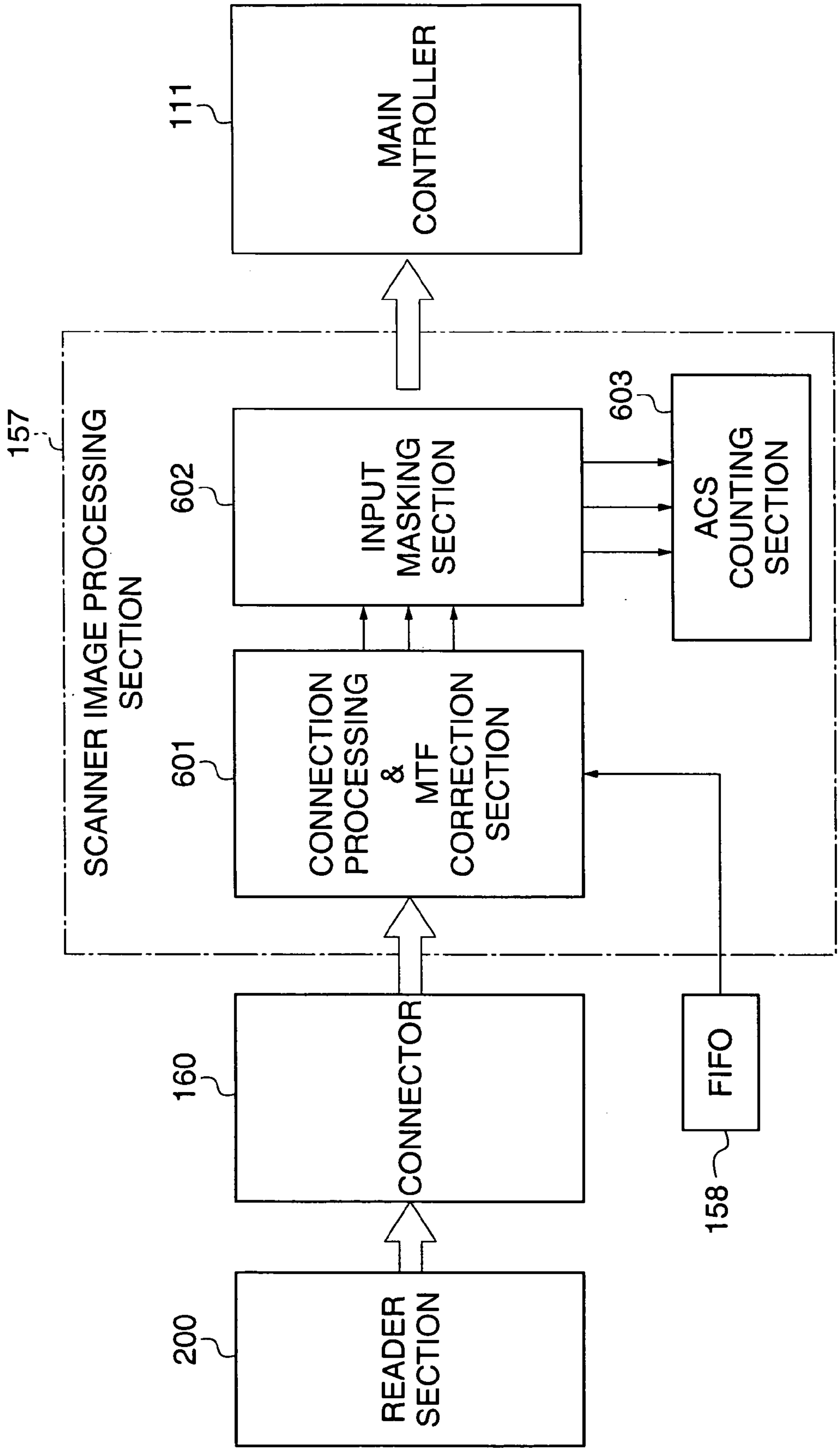
FIG. 6 is a block diagram showing the construction of a scanner image processing section 157.

FIG. 6 is a block diagram showing the construction of the scanner image processing section 157.

In FIG. 6, the scanner image processing section 157 is comprised of a connection processing & MTF (Modulation Transfer Function) correction section 601, an input masking section 602, and an ACS counting section 603.

The connection processing & MTF correction section 601 adjusts a delay per line for an image signal sent from the reader section 200 via the connector 160 in accordance with the original reading speed, and corrects a modulation transfer function (MTF) that changes according to the original reading speed. For example, in the case where the CCD 218 is a three-line CCD, the signal timing is corrected such that the read position is the same between the three lines.

Specifically, the connection processing & MTF correction section 601 corrects the reading position timing for the image signal by using the FIFO 158 as a line delay buffer. The input masking section 602 corrects the image signal thus corrected for the reading position timing, according to spectral characteristics of the CCD 218 and spectral characteristics of the lamp 212 and the mirrors 214, 215, and 216. The output from the input masking section 602 is sent to the ACS counting section 603 and the graphic processor 151.

Figure 7A:
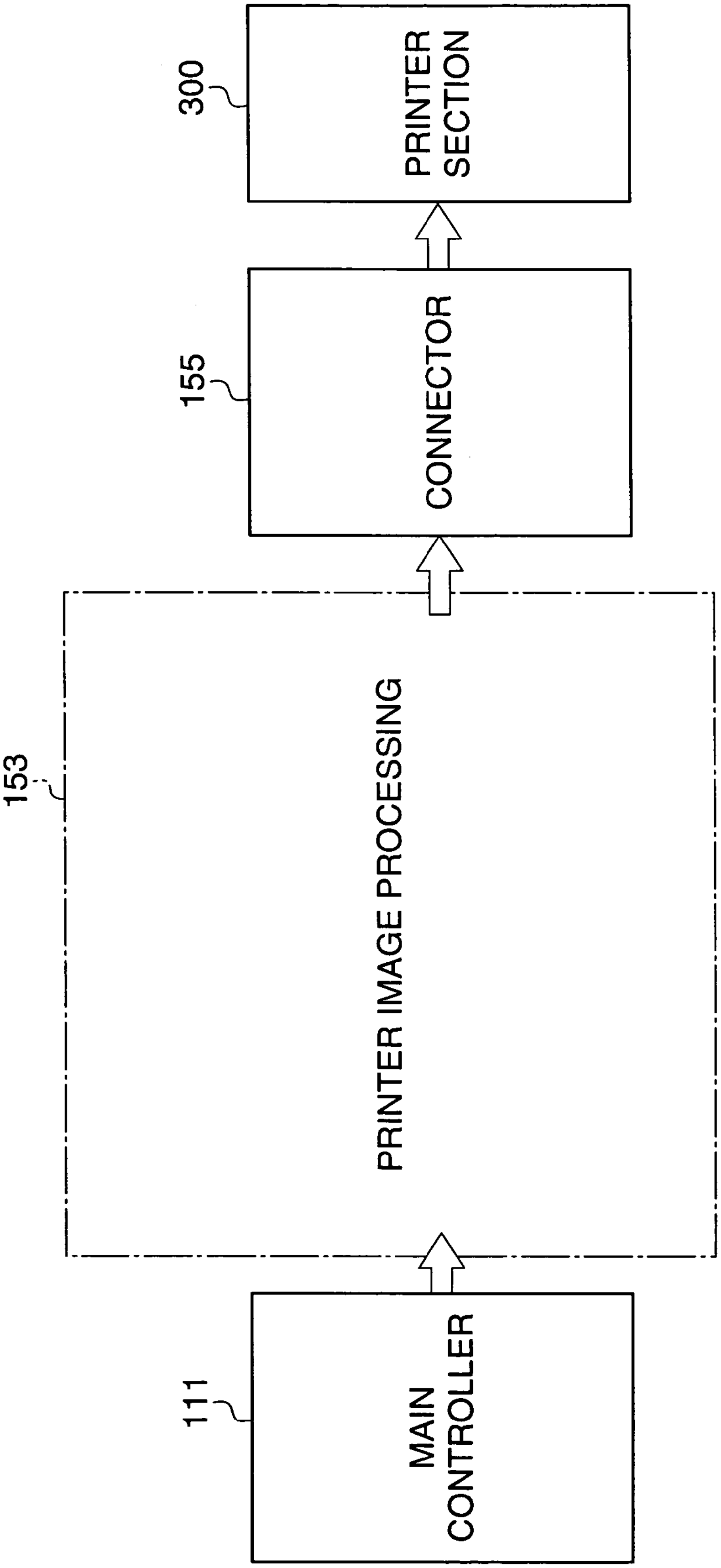
FIGS. 7A and 7B are block diagram showing the construction of a printer image processing section 153.
Figure 7B:
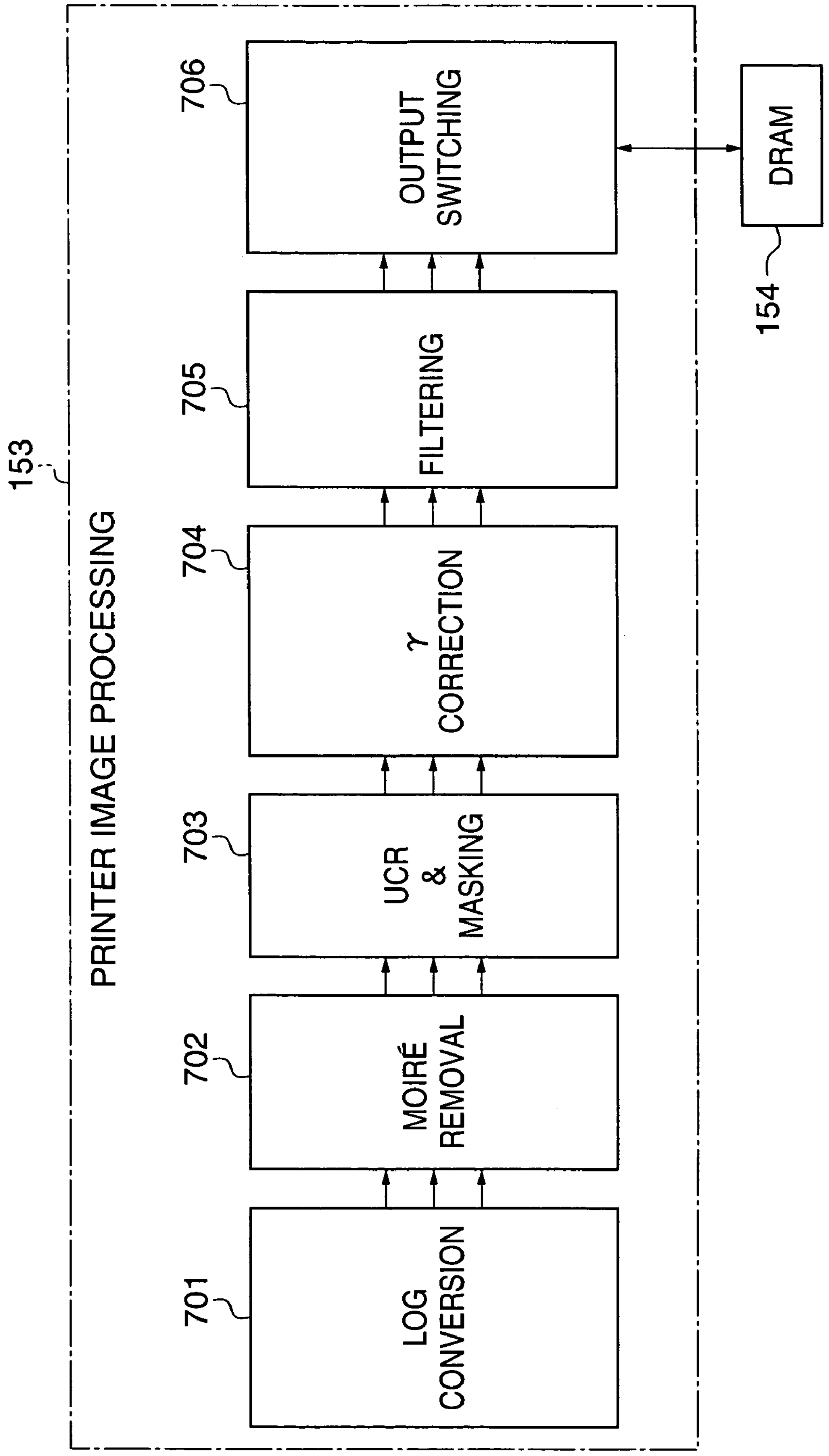

FIGS. 7A and 7B are block diagram showing the construction of the printer image processing section 153.

In FIGS. 7A and 7B, the printer image processing section 153 is comprised of a LOG conversion section 701, a moire removal section 702, a UCR & masking section 703, a γ correction section 704, a filter section 705, and an output switch 706, with these component elements being connected in series.

The LOG conversion section 701 carries out a LOG conversion on an image signal input from the graphic processor 151 via the printer bus 156, thereby converting the RGB signals into CMY signals.

The moiré removal section 702 removes moiré from the CMY signals. The UCR & masking section 703 carries out UCR processing on the CMY signals that have been subjected to moiré removal to generate CMYK signals, and also carries out masking on the CMYK signals into signals suitable for printer output. The signals thus produced by the UCR & masking section 703 are subjected to a density adjustment in the γ correction section 704, and are then subjected to smoothing and edge correction processing by the filter section 705.

The output switch 706 temporarily stores image data for the respective CMYK images in the DRAM 154 to compensate for the distances between the photosensitive drums 321 to 324, and the image data for which the inter-drum distances have been corrected are sent via the connector 155 to the printer section 300.

Figure 8:
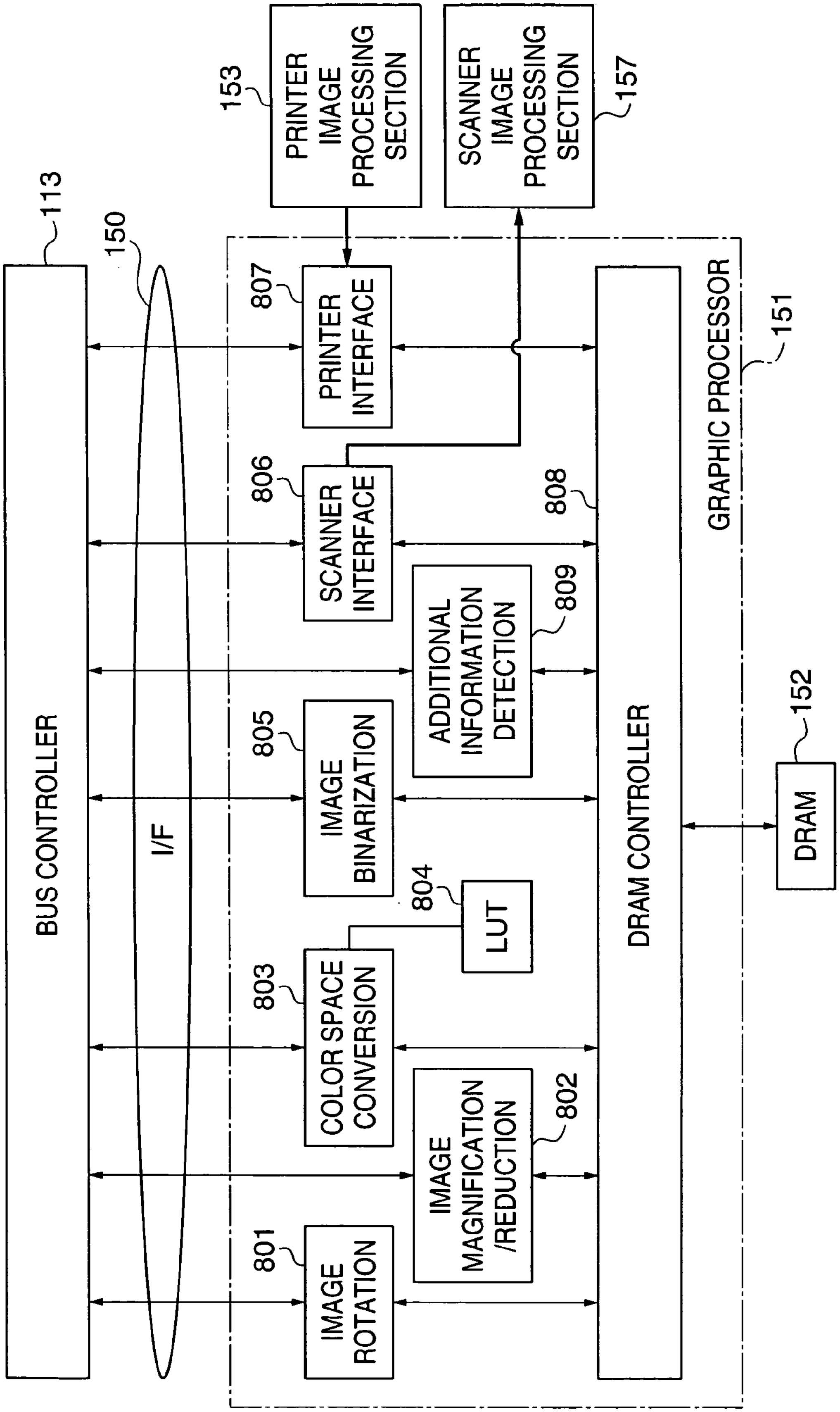
FIG. 8 is a block diagram showing the construction of a graphic processor 151.

FIG. 8 is a block diagram showing the construction of the graphic processor 151.

In FIG. 8, the graphic processor 151 is comprised of modules for performing various image processes, such as an image rotation section 801 that carries out image rotation, an image magnification section 802 that carries out image magnification/reduction, color space conversion section 803 that carries out color space conversion, an image binarization section 805 that carries out binarization of image data, a scanner interface 806 that inputs a scanner image, a printer interface 807 that outputs a printer image, and an additional information detection section 809 that detects additional information.

The modules mentioned above use the DRAM 152 as a temporary work area via a DRAM controller 808. To prevent conflicts over the work area in the DRAM 152 used by the modules, work areas are statically assigned to the respective modules in advance.

The graphic processor 151 is connected via the interface 150 to the bus controller 113. Data transfer between the DRAM 122 and the graphic processor 151 is controlled by the bus controller 113 such that the data is DMA-transferred. The bus controller 113 provides control to set modes and the like of the respective modules of the graphic processor 151 and control of timing for transferring image data to the respective.

Figure 9:
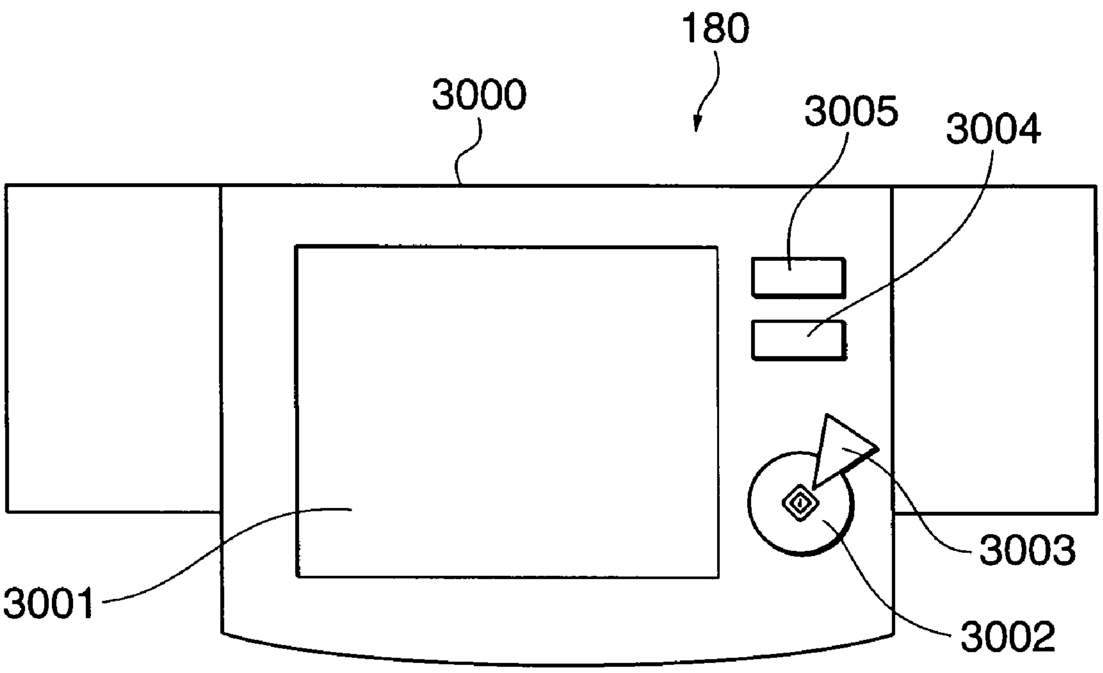
FIG. 9 is a view showing the layout of an operating section 180.

FIG. 9 is a view showing the layout of the operating section 180.

In FIG. 9, the operating section 180 has an LCD display section 3001 disposed at a central part, and a start key 3002, an ID key 3004, and a reset key 3005 disposed at a side of the LCD display section 3001 in the order mentioned from the bottom.

The LCD display section 3001 is comprised of an LCD that displays an operating screen 3010 (see FIG. 10) and a touch panel sheet that is stuck on the entire surface of the LCD. The LCD display section 3001 displays the operating screen 3010 and when a displayed key is pressed on the touch panel sheet, position information indicative of the pressed position is transferred to the CPU 112 of the main controller 111.

The start key 3002 is used to start a reading operation for an image of an original. A dual color LED, i.e. a red and green LED is provided in the center of the start key 3002, and according to the color indicated by the lit LED, it is possible to determine whether the start key can be used. A stop key 3003 is disposed above and to the right of the start key 3002, and is used to stop an ongoing operation. The ID key 3004 is used to input a user ID of the user. The reset 3005 is used to initialize the settings of the operating section 180.

Figure 10:
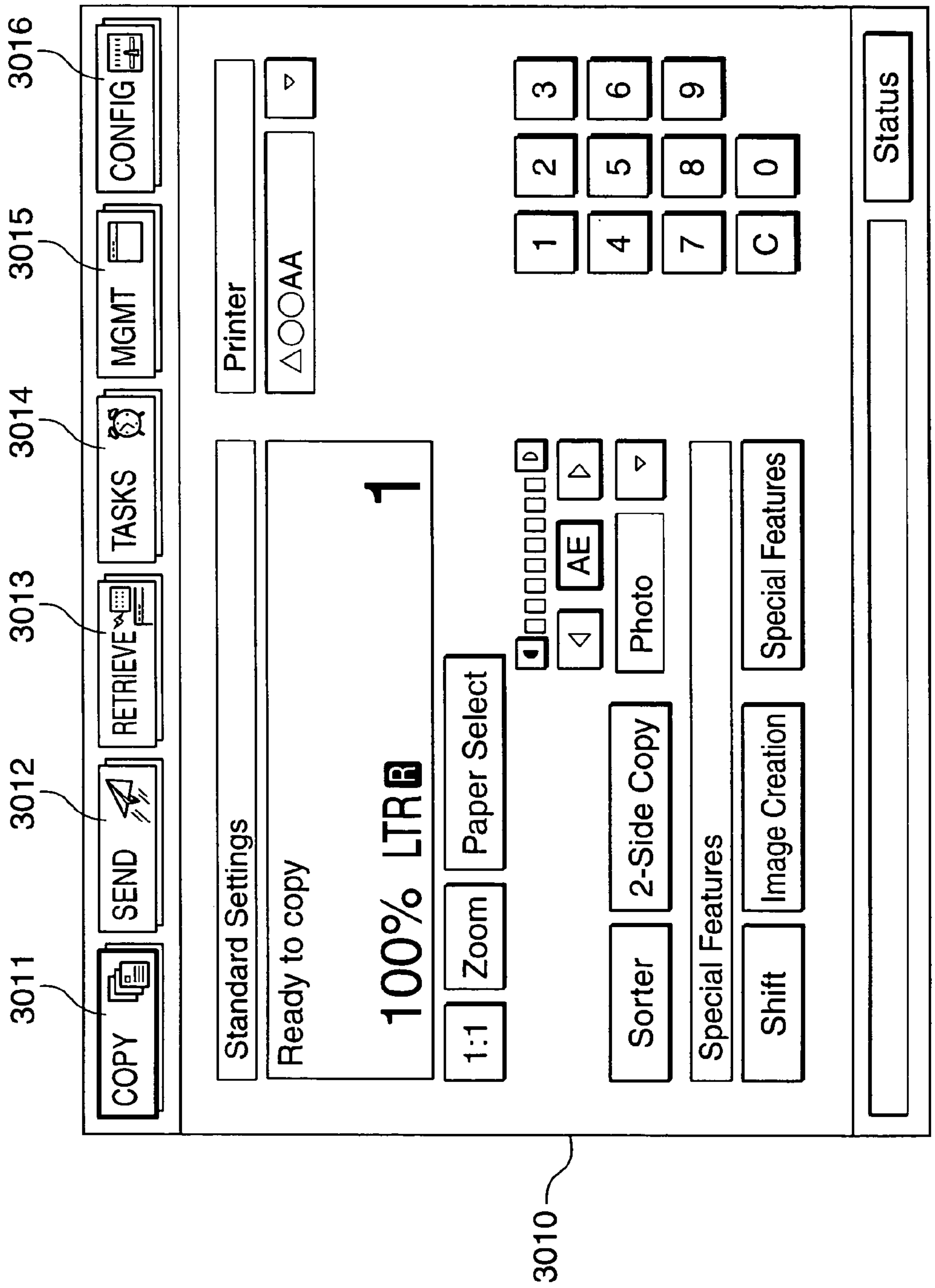
FIG. 10 is a view showing an operating screen 3010.

FIG. 10 is a view showing the operating screen 3010. The functions provided by the multi-function apparatus 1001 are roughly classified into six categories: Copy; Send; Retrieve; Tasks; Management; and Configuration. By pressing six main tabs (COPY 3011, SEND 3012, RETRIEVE 3013, TASKS 3014, MGMT 3015, and CONFIG 3016) displayed in an upper part of the operating screen 3010, it is possible to switch between screens for the respective categories. The operating screen 3010 is configured such that when switching to a different category is not permitted, display colors of main tabs change and nothing happens when any main tab is pressed.

The "Copy" category includes a function of using the scanner and printer in this multi-function apparatus 1001 to perform a normal copying operation for a document, and a function of using the scanner in this multi-function apparatus 1001 and a printer connected via a network to perform a copying operation for a document ("remote copying").

The "Send" category is a function of transferring a document placed on the scanner in this multi-function apparatus 1001 for electronic mail, to a remote printer, for a facsimile, for file transfer (FTP), or to a database, with it being possible to designate a plurality of destinations. The "Retrieve" category is a function of obtaining an external document and printing the document using the printer in this multi-function apparatus 1001. Here, as examples, the document can be obtained via the WWW (World Wide Web), electronic mail, FTP, or facsimile.

The "Tasks" category generates and manages tasks, such as "facsimile" and "Internet print", for automatically processing documents sent from outside and periodically performing "Retrieve". The "Management" category manages jobs, an address book, bookmarks, documents, account information, and the like. The "Configuration" category makes settings (such as network and clock settings) of this multi-function apparatus 1001.

Figure 11:
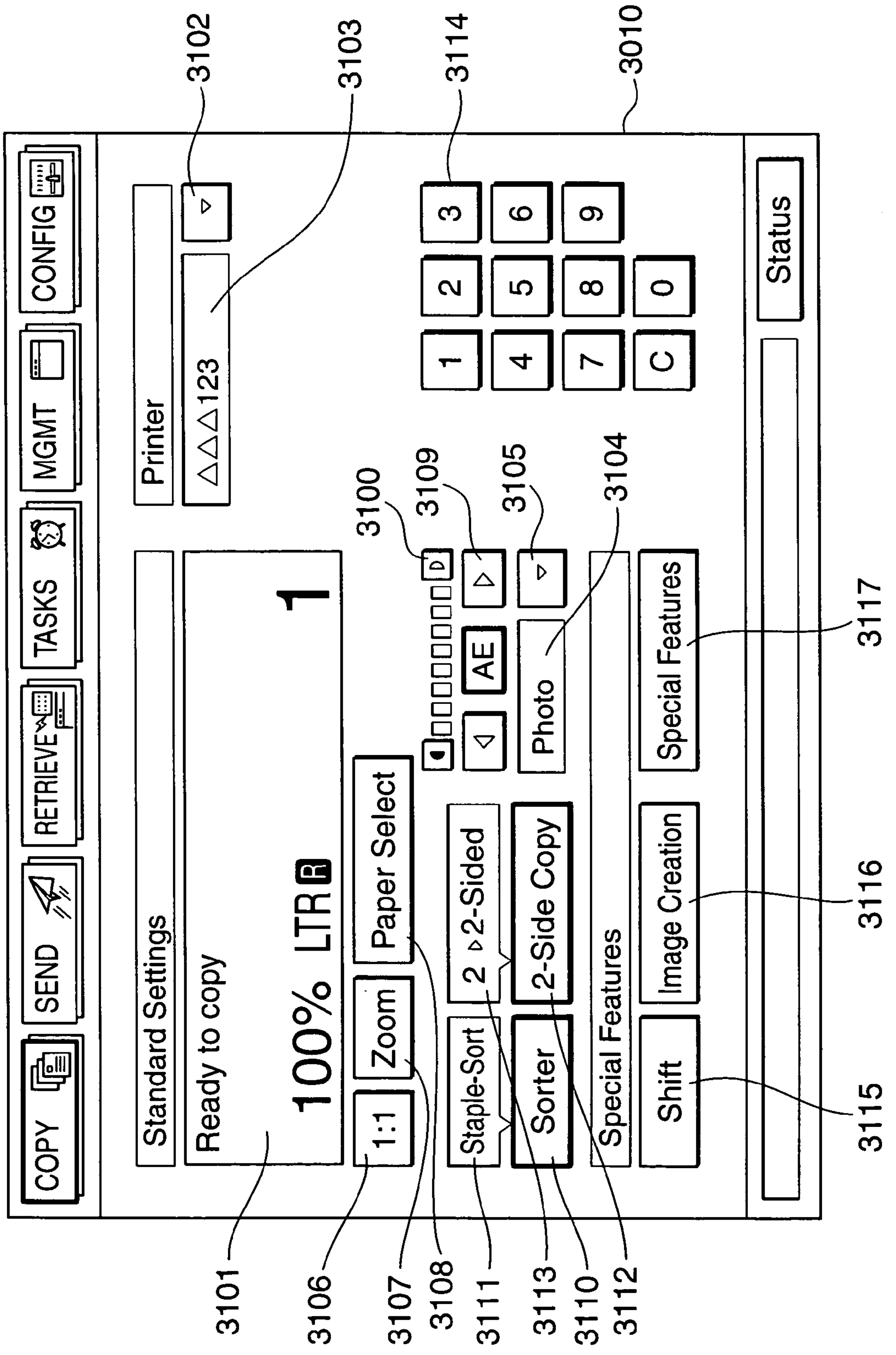
FIG. 11 is a view showing a COPY screen.

FIG. 11 is a view showing a COPY screen. The COPY screen is a display screen of the operating screen 3010 when a main COPY tag 3011 has been pressed. If the start button 3002 is pressed while the COPY screen is being displayed, the scanner operates and copies are outputted from a selected printer in accordance with various setting parameters that are displayed on the screen.

The COPY screen is comprised of a printer selection button 3103, a printer display region 3102, an image quality selection button 3105, an image quality display region 3104, a copy parameter display section 3101 that is similar to the conventional copying apparatus, enlarge/reduce setting buttons 3106 and 3107, a sheet selection button 3108, a sorter setting button 3110, a double-sided copy setting button 3112, a density indicator 3100, a density setting button 3109, and a ten key 3114.

Figure 12:
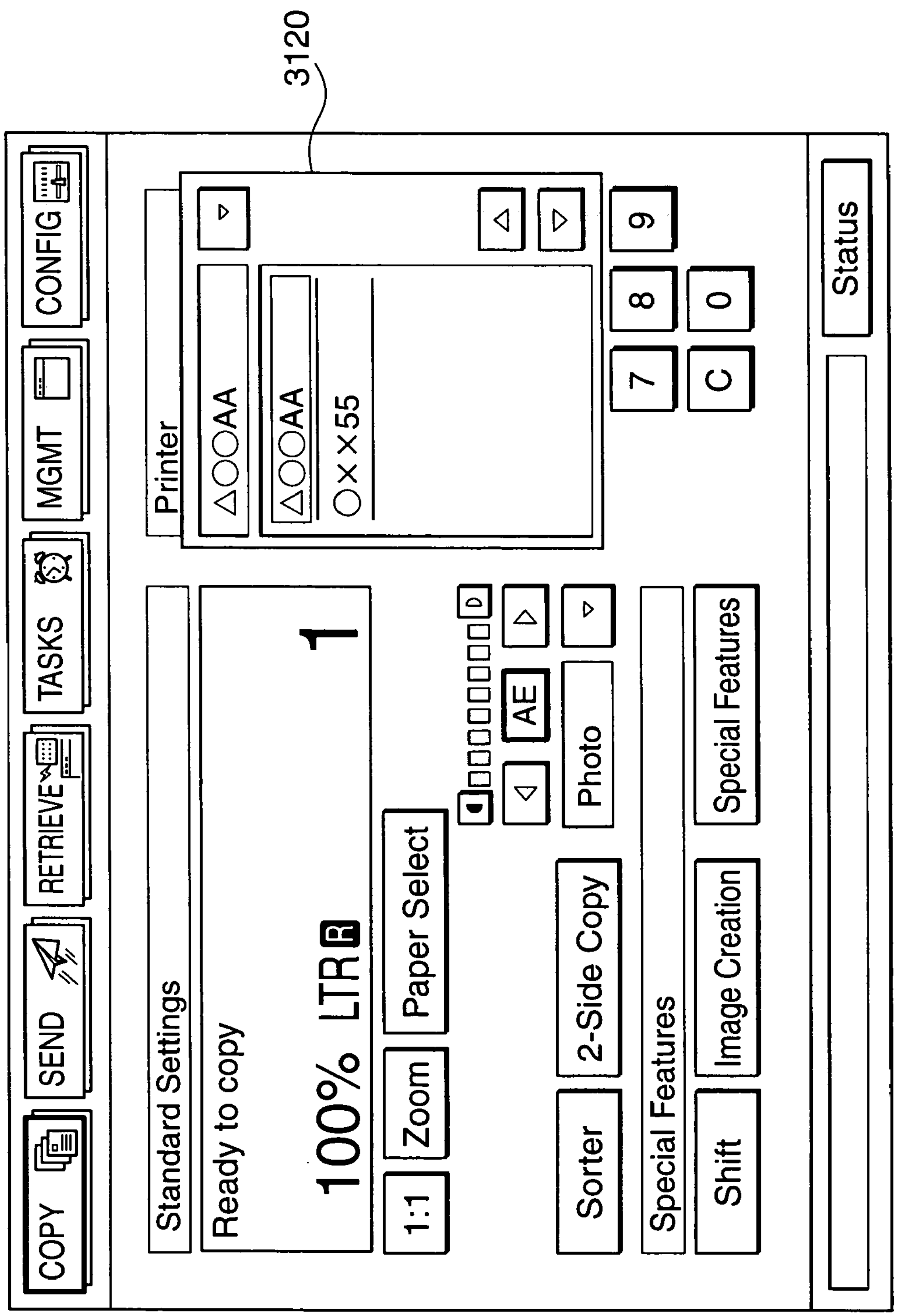
FIG. 12 is a view showing a printer list display screen.

When the printer selection button 3103 is pressed, a list 3120 of usable printers (the printer in this multi-function apparatus 1001 and any printers connected via the network) is displayed as a pull-down menu as shown in FIG. 12. When a desired printer is selected from the list, the list vanishes and the selected printer name is displayed in the printer display region 3102.

When the image quality selection button 3105 is pressed, an image quality list is displayed from which a desired image quality can be selected. When the copy parameter setting buttons mentioned above are selectively pressed, a subscreen (enlarge/reduce setting, sheet selection, sorter setting, double-sided copy setting) is displayed for making the corresponding settings, so that parameters can be set in the same way as with the conventional copying apparatus. The density setting is also made via the same operation as with the conventional copying apparatus.

Figure 13:
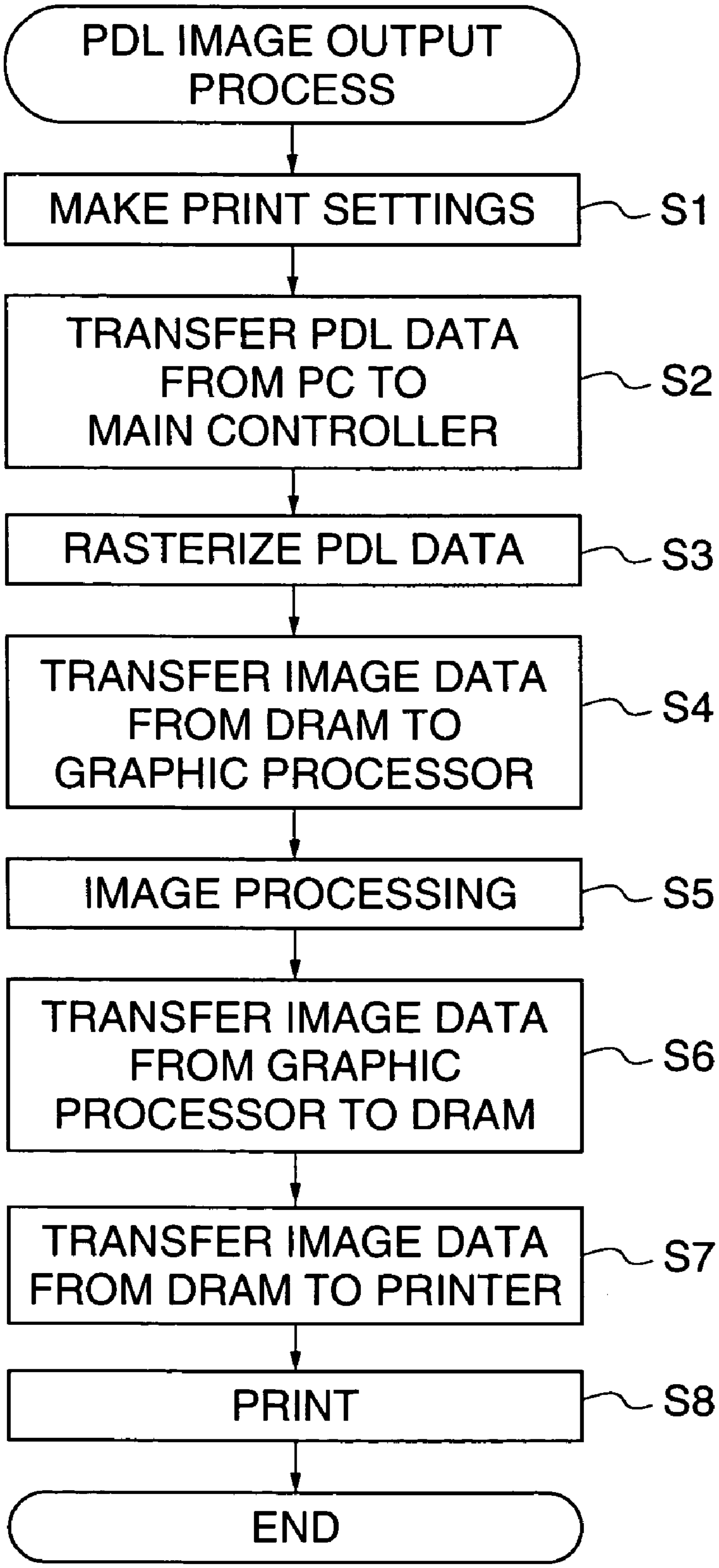
FIG. 13 is a flowchart showing the procedure of a PDL image output process.

FIG. 13 is a flowchart showing the procedure of a PDL image output process.

In FIG. 13, first, the user makes print settings for a PDL image output job on the PC (host computer) 401 in FIG. 2 (step S1). The print settings include settings as to a number of copies, a sheet size, single-sided or double-sided, a page output order, sorted output on/off, stapling on/off, and the like.

When a print instruction is issued on the PC 401, driver software installed on the PC 401 converts code data in the PC 401 that is to be printed, into PDL data and transfers the PDL data together with the print setting parameters set in the step S1 via the LAN 1010 to the controller section 110 of the multi-function apparatus 1001 (step S2).

Based on the print setting parameters, the CPU 112 inside the main controller 111 of the controller section 110 expands the PDL data transferred via the connector 126 and the network controller 125 into image data, that is, the CPU 112 rasterizes the code data (step S3). This rasterizing of the image data is carried out in the DRAM 122.

When the rasterization of the image data is completed, the main controller 111 transfers the rasterized image data in the DRAM 122 to the graphic processor 151 (step S4). The graphic processor 151 carries out image processing independently of the print setting parameters (step S5). For example, regardless of whether the set sheet size designated by the print setting parameters is A4, when only A4R sheets are present in the feeder unit 360 of the printer section 300, the graphic processor 151 can carry out image output suitable for the output sheet by rotating the image by 90 degrees.

When such image processing of the image data is completed, the graphic processor 151 transfers the processed image data to the main controller 111 (step S6). The main controller 111 stores the transferred image data in the DRAM 122.

While controlling the printer section 300 via the graphic processor 151, the printer image processing section 153, and the connector 155, the main controller 111 transfers the image data in the DRAM 122 to the printer section 300 in appropriate timing (step S7). The controller section 110 controls the printer section 300 to print out the image data (step S8). When all of the image data has been transferred, that is, when this PDL job is completed, the print output operation is terminated.

Figure 14:
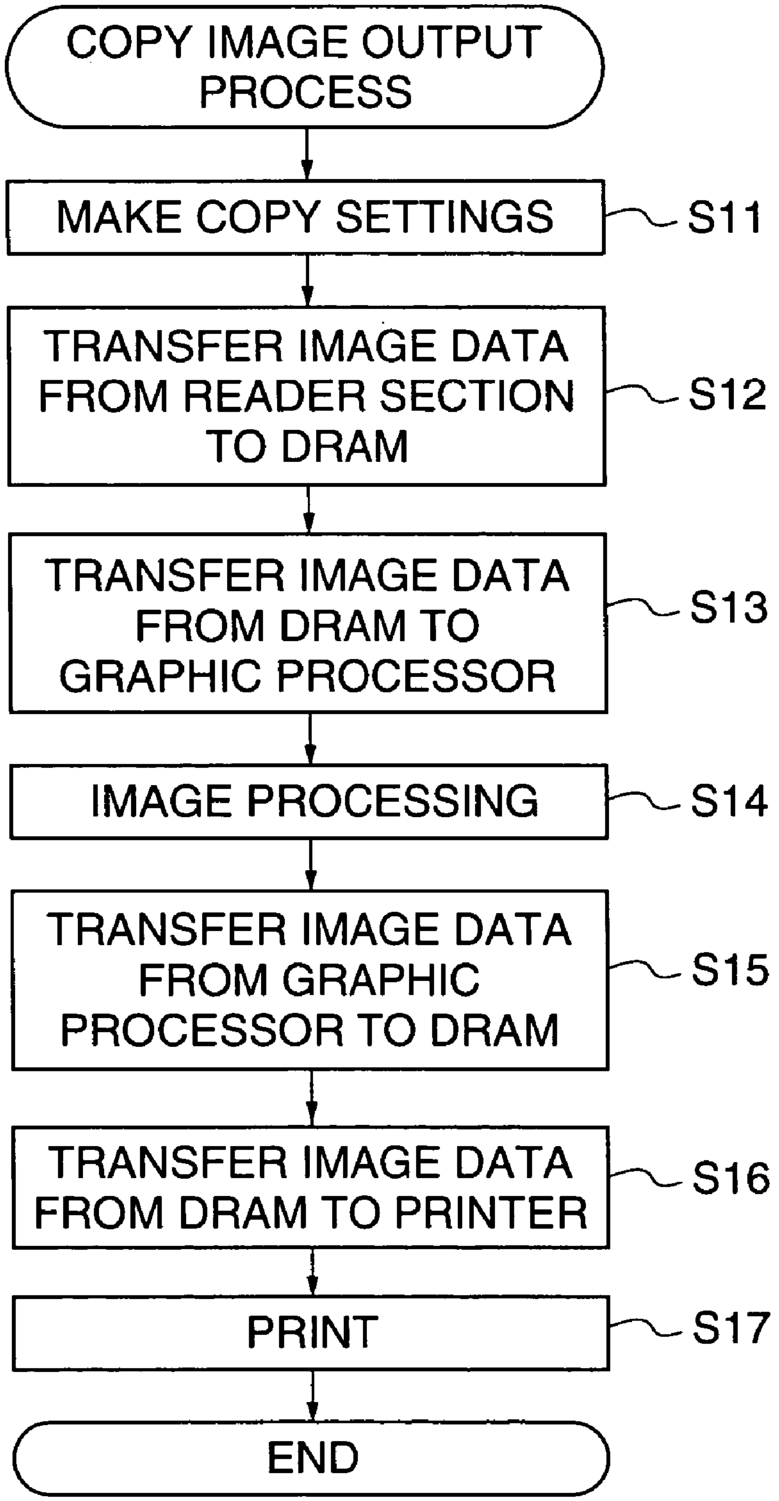
FIG. 14 is a flowchart showing the procedure of a copy image output process.

FIG. 14 is a flowchart showing the procedure of a copy image output process.

In FIG. 14, first, the user makes copy settings for a copy image output job on the operating section 180 (step S11). These copy settings include settings as to a number of copies, a sheet size, single-sided or double-sided, an enlargement/reduction ratio, sorted output on/off, stapling on/off, and the like.

When a copy start instruction is given on the operating section 180, the main controller 111 of the controller section 110 controls the reader section 200 via the connector 160 to carry out a reading operation for image data of an original (step S12). First, the original feeder unit 250 feeds stacked originals one sheet at a time to the platen glass 211 and at the same time detects the size of the fed original. The original on the platen glass 211 is illuminated and scanned based on the detected size, whereby the image data is read. The read image data is compressed by the graphic processor 151 according to a designated image format, and the compressed image data is stored in the DRAM 122.

In the conventional copying apparatus, a magnification/reduction process in a sub-scanning direction is realized by changing the moving speed of the optical unit 213 in accordance with setting of the enlargement/reduction ratio in the copy settings, that is, the magnification/reduction ratio in the sub-scanning direction. In the copying apparatus of the present embodiment, however, image data is read 100% magnification or equimultiplication regardless of the setting of the enlargement/reduction ratio in the copy settings, and the magnification/reduction process is carried out in both the main scanning direction and the sub-scanning direction by the graphic processor 151, as described later.

The main controller 111 transfers the image data in the DRAM 122 to the graphic processor 151 (step S13). The graphic processor 151 carries out image processing based on the copy setting parameters (step S14). For example, when an enlargement of 400% has been set, the image magnification section 802 that is a module inside the graphic processor 151 is caused to perform a magnification/reduction process in both the main scanning direction and the sub-scanning direction.

When the image processing of image data is completed, the graphic processor 151 compresses the processed image data according to the designated image format and transfers the compressed image data to the main controller 111, which stores the transferred image data in the DRAM 122 (step S15).

The main controller 111 converts the image data stored in the DRAM 122 into a file of a designated file format and transfers the image data file via the HD controller 131 to the HD drive 132, thus storing the read image data in the HD drive 132. These operations are repeated so long as there are originals on the DF unit 250.

The image data is then transferred to the printer section 300 (step S16). At this time, when no image data file to be printed is present in the DRAM 122, an image file is read from the HD drive 132 and is stored in the DRAM 122. While controlling the printer section 300 via the graphic processor 151, the printer image processing section 153, and the connector 155, the main controller 111 transfers the image data in the DRAM 122 to the printer section 300 in appropriate timing.

The controller section 110 controls the printer section 300 to print out the image data (step S17). When all of the image data has been transferred, that is, when the copy job is completed, the print output operation is terminated.

Figure 15:
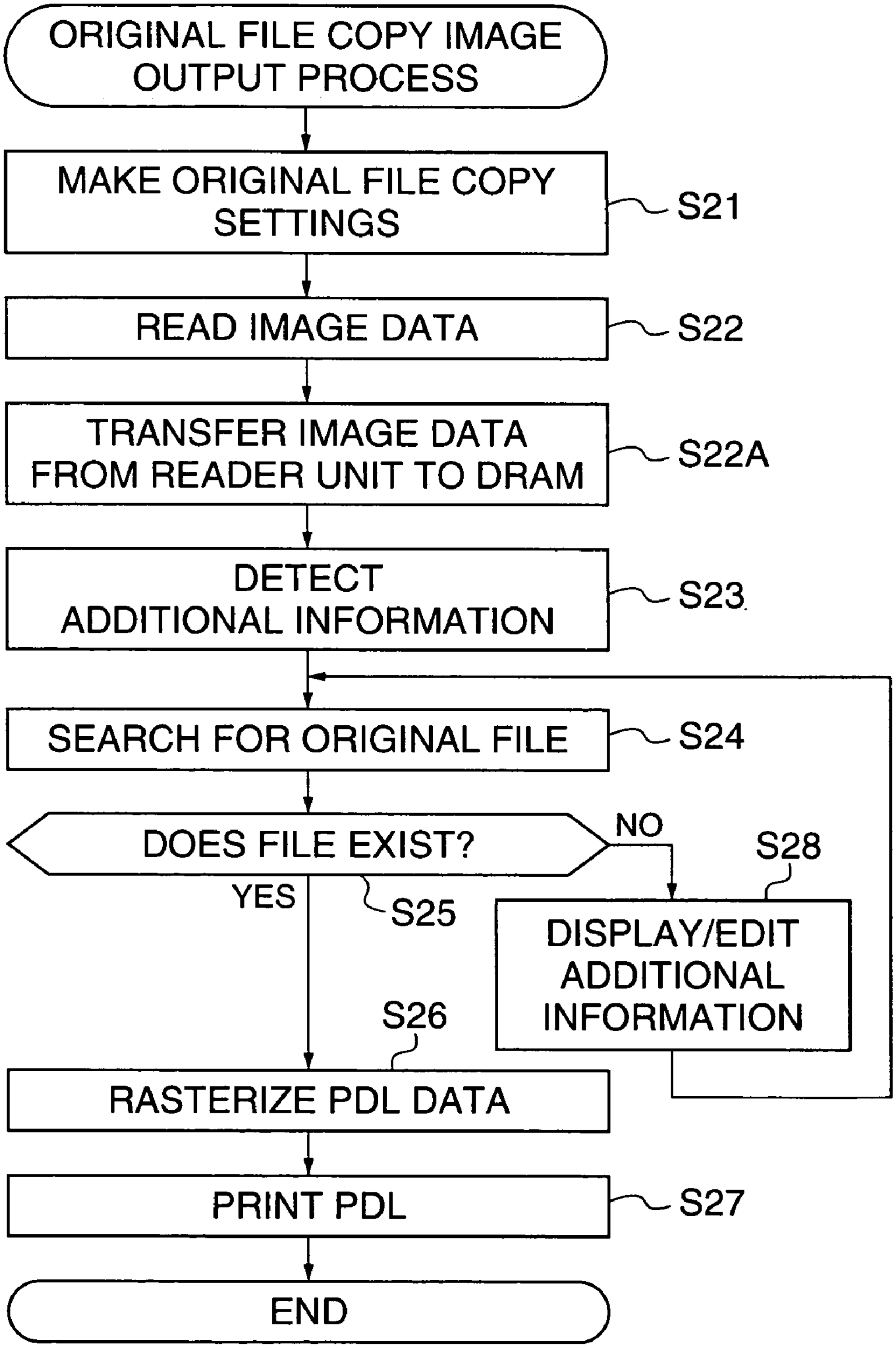
FIG. 15 is a flowchart showing the procedure of an original file copy image output process.

FIG. 15 is a flowchart showing the procedure of an original file copy image output process.

In FIG. 15, first, the user makes settings for an original file copy image output job on the operating section 180 (step S21). These settings include settings as to a number of copies, a sheet size, single-sided or double-sided, an enlargement/reduction ratio, sorted output on/off, stapling on/off, and the like.

When a copy start instruction has been given on the operating section 180, the main controller 111 of the controller section 110 controls the reader section 200 via the connector 160 to carry out a reading operation for image data of an original (step S22). Specifically, first, the original feeder unit 250 feeds stacked originals one sheet at a time to the platen glass 211 and at the same time detects the size of the fed original. The original on the platen glass 211 is illuminated and scanned based on the detected size, thereby reading the image data. The read image data is compressed by the graphic processor 151 according to a designated image format, is transferred to the DRAM 122 (step S22A), and is thereafter stored in the DRAM 122.

The main controller 111 transfers the image data in the DRAM 122 to the additional information detection section 809 of the graphic processor 151, where the additional information added to the original is detected (step S23). This additional information can be implemented in a variety of ways, such as by an electronic watermark embedded in an image, a bar code embedded in an image region, or a identification code, but is not limited to these examples and can be any information that can be added to an image.

Then, a search for an original file corresponding to the original is carried out via the network (step S24). It is determined whether the original file has been found (step S25), and when the original file has been found, the file is expanded into PDL data by the PC 401 and the resulting PDL data is transferred to the multi-function apparatus 1001 via the LAN 1010 (step S26). At this time, print settings of the PDL image output job are carried out based on the settings of the original file copy image output job mentioned above. The received PDL data is processed and printed out in the same way as the PDL image output process described with reference to FIG. 13 hereinbefore (step S27), and the present process is terminated.

Figure 16:
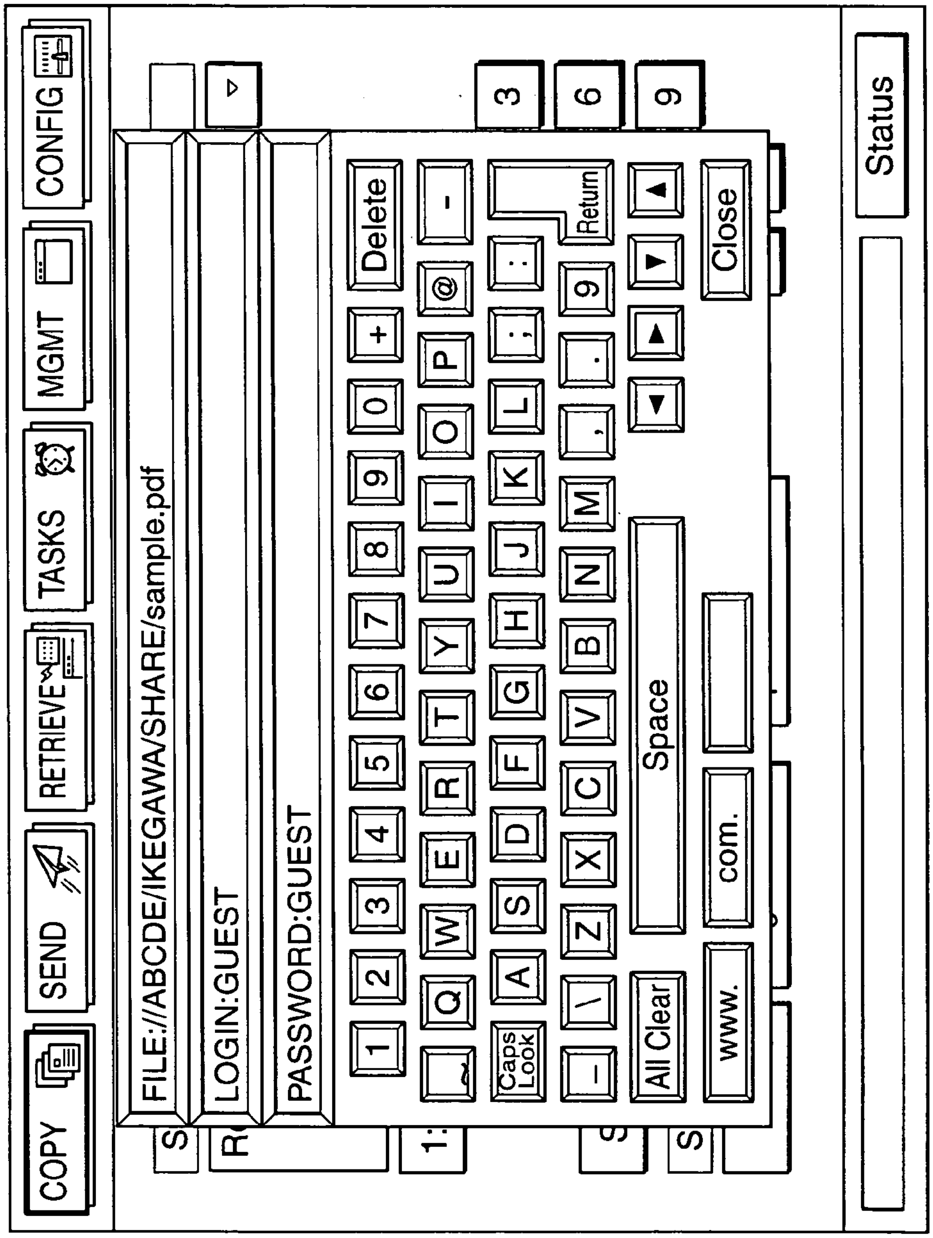
FIG. 16 is a view showing an operating/editing screen.

On the other hand, when the original file is not found in step S25, file path information obtained from the detected additional information is displayed on an operating/editing screen (see FIG. 16) of the operating screen 3010 as the LCD display section 3001, to enable editing of the additional information (step S28). Although the file path information is used here, the additional information edited here is not limited to file path information, and any information that can indicate an original file, such as a URL, an electronic mail address, and a FAX number, may be used. Also, in the case where additional information such as a login name and a password is embedded in addition to file information on the original file, such information may be displayed and edited.

As described above, according to the present embodiment, even when the image quality of an original is heavily degraded such that the additional information cannot be read or is not correctly recognized, the additional information can be corrected to make it possible to conduct a proper search for an original file. Further, the operating/editing screen is displayed to enable editing of the additional information only in the case where an existing original file cannot be found due to the additional information being incorrect, which enhances the operability of the multi-function apparatus more.

Next, a second embodiment of the present invention will be described.

A copying apparatus according to the second embodiment and a network system including this copying apparatus are identical in construction with the copying apparatus according to the first embodiment described above and the network system including the copying apparatus. The PDL image output process of FIG. 13 and the copy image output process of FIG. 14 are also applied to the second embodiment. While in the first embodiment, when an original file is not found (step S25 in FIG. 15) in the original file copy image output process of FIG. 15, file path information obtained from the detected additional image is displayed on the operating/editing screen (see FIG. 16) as the operating screen 3010 of the LCD display section 3001 to enable editing of the file path information. The second embodiment is distinguished from the first embodiment in that when the additional information added to an original is detected in step S23, the file path information obtained from the detected additional information is immediately displayed on the operating/editing screen (see FIG. 16) as the operating screen 3010 of the LCD display section 3001 to enable editing of the additional information.

Figure 17:
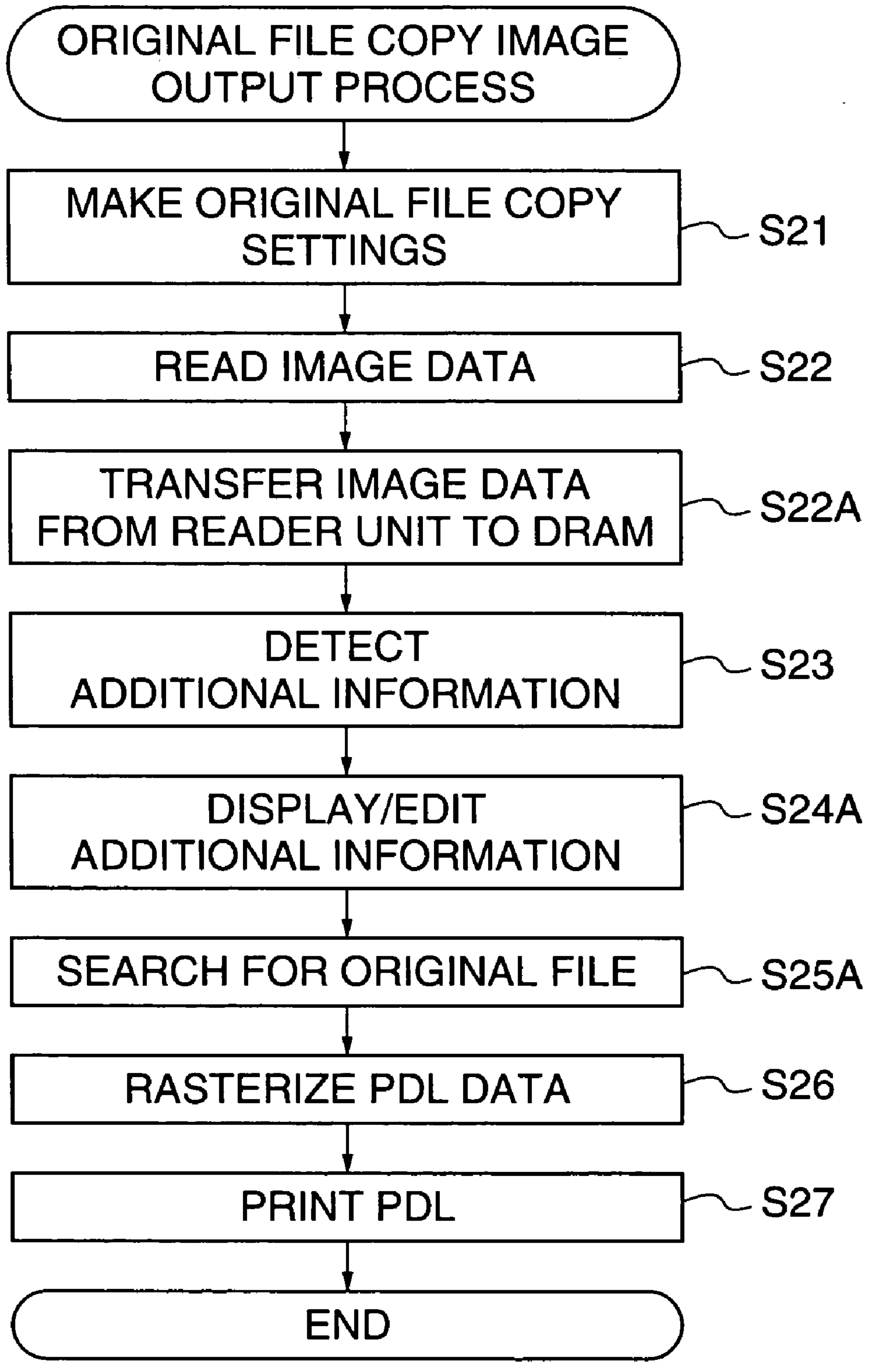
FIG. 17 is a flowchart showing the procedure of an original file copy image output process according to a second embodiment of the present invention.

FIG. 17 is a flowchart showing the procedure of an original file copy image output process according to the second embodiment.

This process is the same as the original file copy image output process of FIG. 15 of the first embodiment in that any information that can indicate an original file corresponding to an original, such as a URL, an electronic mail address, and a FAX number, can be used in place of file path information. Also, if additional information such as a login name and a password is embedded in addition to file information on the original, such information may be displayed and edited. The construction of the operating section 180 is the same as in the first embodiment, and the operating/editing screen displayed as the operating screen 3010 of the LCD display section 3001 is the same as that displayed in FIG. 16.

In FIG. 17, after the same processing has been carried out as in the steps S21 to S23 in FIG. 15, the file path information obtained from the detected additional information is displayed on the operating/editing screen (FIG. 16) as the operating screen 3010 of the LCD display section 3001 to enable editing of the additional information is enabled (step S24A). After this, when the editing of the additional information has been completed, a search is conducted via the LAN 1010 for an original file corresponding to the original (step S25A). When the original file is found, the file is expanded into PDL data by the PC 401 and the resulting PDL data is transferred via the LAN 1010 to the multi-function apparatus 1001 (step S26). At this time, print settings of the PDL image output job are carried out based on the settings of the original file copy image output job mentioned above. The received PDL data is processed and printed out in the same way as the PDL image output process described with reference to FIG. 13 hereinbefore (step S27), and the present process is terminated As described above, according to the present embodiment, even when the image quality of an original is heavily degraded such that the additional information cannot be read or is not correctly recognized, the additional information can be corrected to make it possible to conduct a proper search for an original file. Further, it is possible to check whether or not the additional information is correct before a search is carried out for the original file so that the user can correct the additional information immediately upon determining that the additional information is incorrect.

The present invention is not limited to the above described embodiments and can be applied to any construction that can achieve the functions described in the appended claims or the functions of the constructions of the above described embodiments.

The present invention may either be applied to a system composed of a plurality of apparatuses (e.g. a host computer, interface equipment, a reader, and a printer) or to a single apparatus (e.g. a copying machine, a facsimile machine, or the like).

It is to be understood that the present invention may also be accomplished by supplying a system or an apparatus with a storage medium in which a program code of software which realizes the functions of any of the above described embodiments is stored, and causing a computer (or CPU or MPU) of the system or apparatus to read out and execute the program code stored in the storage medium.

In this case, the program code itself read out from the storage medium realizes the functions of any of the embodiments described above, and hence the storage medium in which the program code is stored constitutes the present invention.

Examples of the storage medium for supplying the program code include a floppy (registered trademark) disk, a hard disk, an optical disk, a magneto-optical disk, a CD-ROM, a CD-R, a CD-RW, a DVD-ROM, a DVD-RAM, a DVD−RW, a DVD+RW, a magnetic tape, a nonvolatile memory card, a ROM, and an EEPROM. Alternatively, the program may be downloaded via a network.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the medium, such as a storage medium, into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. A copying apparatus comprising:

an image input device that inputs an image signal read from an original;

an additional information reading device that reads additional information from the inputted image signal;

a file path information obtaining device that obtains file path information from the read additional information, the file path information addressing a location where an original file corresponding to the original is stored;

a search device that carries out a search for the original file corresponding to the original based on the file path information obtained from the read additional information;

a copy output device that outputs a copy of the original using the original file found as a result of the search by said search device;

a display device that displays the file path information obtained from the read additional information;

an editing device that edits the displayed file path information;

a determining device that determines whether said search device found the original file based on the file path information obtained from the read additional information; and a controller that prompts a user to correct the displayed file path information with said editing device, and controls said search device to carry out the search for the original file with the corrected file path information when said determining device determines that said search device did not find the original file based on the file path information obtained from the read additional information, wherein said controller controls said copy output device to output the copy of the original file searched by said search device without displaying the file path information in said display device when said determining device determines that said search device found the original file based on the file path information obtained from the read additional information.

2. A copying apparatus as claimed in claim 1, wherein said controller determines that editing of the file path information obtained from the additional information by said editing device is possible when the original file has not been found as a result of the search by said search device.

3. A copying apparatus as claimed in claim 1, wherein said controller determines that the search for the original file by said search device is possible when editing of the file path information obtained from the additional information read from the inputted image signal is completed.

4. A copying apparatus as claimed in claim 1, wherein the copying apparatus is connected to at least one information processing apparatus via a network or a communication line, and wherein said search device searches the at least one information processing apparatus for the original file.

5. A copying apparatus as claimed in claim 1, wherein the additional information comprises electronic watermark information embedded in the original.

6. A copying apparatus as claimed in claim 1, wherein the additional information comprises barcode information printed on the original.

7. A method of controlling a copying apparatus, comprising:

an image inputting step of inputting an image signal read from an original;

an additional information reading step of reading additional information from the inputted image signal;

a file path information obtaining step of obtaining file path information from the read additional information, the file path information addressing a location where an original file corresponding to the original is stored;

a searching step of carrying out a search for the original file corresponding to the original based on the file path information obtained from the read additional information;

a copy outputting step of outputting a copy of the original using the original file found as a result of the search in said searching step;

a displaying step of displaying the file path information obtained from the read additional information;

an editing step of editing the displayed file path information;

a determining step of determining whether said searching step found the original file based on the file path information obtained from the read additional information; and a controlling step of prompting a user to correct the displayed file path information by the editing in said editing step, and controlling said searching step to carry out the search for the original file using the corrected file path information when said determining step determines that said searching step did not find the original file based on the file path information obtained from the read additional information, wherein said controlling step controls said copy output step to output the copy of the original file searched by said search step without displaying the file path information-in said displaying step when said determining step determines that the original file based on the file path information obtained from the read additional information was found in said search step.

8. A method as claimed in claim 7, wherein it is determined in said controlling step that editing of the file path information obtained from the additional information in said editing step is possible when the original file has not been found as a result of the search in said searching step.

9. A method as claimed in claim 7, wherein it is determined in said controlling step that the search for the original file in said searching step is possible when editing of the file path information obtained from the additional information read from the inputted image signal is completed.

10. A method as claimed in claim 7, wherein the copying apparatus is connected at least one information processing apparatus via a network or a communication line, and wherein in said searching step the at least one information processing apparatus is searched for the original file.

11. A method as claimed in claim 7, wherein the additional information comprises electronic watermark information embedded in the original.

12. A method as claimed in claim 7, wherein the additional information comprises barcode information printed on the original.

13. A computer-readable storage device storing a computer program for controlling a copying apparatus, the computer program comprising:

an image input module for inputting an image signal read from an original;

an additional information reading module for reading additional information from the inputted image signal;

a file path information obtaining module for obtaining file path information from the read additional information, the file path information addressing a location where an original file corresponding to the original is stored;

a search module for carrying out a search for the original file corresponding to the original based on the file path information obtained from the read additional information;

a copy output module for outputting a copy of the original using the original file found as a result of the search by said search module;

a display module for displaying the file path information obtained from the read additional information;

an editing module for editing the displayed file path information;

a determining module for determining whether said search module found the original file based on the file path information obtained from the read additional information; and a controlling module for prompting a user to correct the displayed file path information by the editing in said editing module, and controlling said search module to carry out the search for the original file using the corrected file path information when said determining module determines that said search module did not find the original file based on the file path information obtained from the read additional information, wherein said controlling module controls said copy output module to output the copy of the original file searched by said search module without displaying the file path information by said display module when said determining module determines that the original file based on the file path information obtained from the read additional information was found by said search module.

* * * * *